(12) United States Patent
Wang et al.

(10) Patent No.: US 8,089,778 B2
(45) Date of Patent: Jan. 3, 2012

(54) HAND-HELD ELECTRONIC DEVICE

(75) Inventors: Yi-Shen Wang, Taoyuan (TW); Yi-Chi Lin, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 848 days.

(21) Appl. No.: 12/139,572

(22) Filed: Jun. 16, 2008

(65) Prior Publication Data
US 2009/0091545 A1    Apr. 9, 2009

(30) Foreign Application Priority Data

Oct. 3, 2007  (TW) ................................ 96137155 A

(51) Int. Cl.
*H05K 7/14* (2006.01)
(52) U.S. Cl. ........ 361/796; 361/737; 361/752; 361/803; 455/575.1; 455/575.8; 455/566; 455/90.3
(58) Field of Classification Search .................. 361/796, 361/737, 752, 803; 455/575.1, 575.8, 566, 455/90.3
See application file for complete search history.

(56) References Cited

U.S. PATENT DOCUMENTS

| | | | |
|---|---|---|---|
| 4,969,647 A * | 11/1990 | Mical et al. ..................... | 463/31 |
| 6,088,024 A | 7/2000 | Yamagata | |
| 7,365,808 B2 | 4/2008 | Takita et al. | |
| 7,499,284 B2 * | 3/2009 | Kawanobe et al. ............ | 361/752 |
| 2006/0238517 A1 | 10/2006 | King et al. | |
| 2007/0152980 A1 * | 7/2007 | Kocienda et al. ............. | 345/173 |
| 2008/0007539 A1 * | 1/2008 | Hotelling ...................... | 345/173 |

FOREIGN PATENT DOCUMENTS

| | | |
|---|---|---|
| CN | 1638616 | 7/2005 |
| TW | 200526306 | 8/2005 |

OTHER PUBLICATIONS

English language translation of abstract of CN 1638616 (published Jul. 13, 2005).
Taiwanese language office action dated May 4, 2011.
English language translation of abstract of TW 200526306 (published Aug. 16, 2005).

* cited by examiner

*Primary Examiner* — Yuriy Semenenko
*Assistant Examiner* — Andargie M Aychillhum
(74) *Attorney, Agent, or Firm* — Thomas|Kayden

(57) ABSTRACT

A hand-held electronic device including a body, a touch-sensing display area, and a holding area is provided. The touch-sensing display area located at a surface of the body is divided into several sub-touch-sensing areas disposed at a part of a surrounding region of the touch-sensing display area. The sub-touch-sensing areas have at least one access-sensing region. The access-sensing region is used for sensing a touch-control action so as to render the hand-held electronic device to perform a function corresponding to the touch-control action. The holding area is disposed outside the sub-touch-sensing areas. When a user only intends to hold the hand-held electronic device, the user's hands can put on the holding area and the hand-held electronic device would not perform any corresponding function.

17 Claims, 4 Drawing Sheets

HAND-HELD ELECTRONIC DEVICE

This application claims the benefit of Taiwan application Serial No. 096137155, filed Oct. 03, 2007, the subject matter of which is incorporated herein by reference.

BACKGROUND OF THE INVENTION

1. Field of the Invention

The invention relates in general to a hand-held electronic device, and more particularly to a hand-held electronic device having a touch-sensing display area and a holding area for avoiding an unexpected operation of the hand-held electronic device when the touch-sensing display area is touched unintentionally.

2. Description of the Related Art

The development trend of hand-held electronic device directs toward smaller, thinner and lighter for being conveniently bringing. However, many conventional hand-held electronic devices are disposed with input control keys on front surfaces thereof, so that a large portion of the devices' tiny front surfaces are occupied. As the space of the front surface is limited, users frequently touch the input control keys unintentionally to cause an unexpected operation of the device while simply holding the device.

FIG. 1 shows a front view of a conventional hand-held electronic device 100. Referring to FIG. 1, input keys 111~113 of the electronic device 100 are all located at two sides of a front surface. As the space of the front surface of the electronic device 100 is limited, a user's hand may still touch the input keys 111~113 to unintentionally operate the electronic device 100 via the input keys 111~113 while the user simply holds the device to read the displayed contents or only take a rest. At this time, if the user's hand unexpectedly presses at least one of the input keys 111~113, an unexpected operation of the electronic device 100 would occur.

SUMMARY OF THE INVENTION

The invention is directed to a hand-held electronic device including a touch-sensing area and a holding area which are disposed separately. The touch-sensing area is used for controlling the electronic device. The holding area is used for allowing a user's hand to be rested thereon when the user does not operate the electronic device. With the separate disposition of the touch-sensing area and the holding area, the invention resolves an unexpected operation problem occurring to the conventional hand-held electronic device due to the input keys often being unintentionally touched when the user merely holds the electronic device.

According to the present invention, a hand-held electronic device including a body, a touch-sensing display area and a holding area is provided. The touch-sensing display area located at a surface of the body is divided into several sub-touch-sensing areas disposed at a part of a surrounding region of the touch-sensing display area. The sub-touch-sensing areas have at least one access-sensing region. The access-sensing region is used for sensing a touch-control action so as to render the hand-held electronic device to perform a function corresponding to the touch-control action. The holding area is disposed outside the touch-sensing display area.

The invention will become apparent from the following detailed description of the preferred but non-limiting embodiments. The following description is made with reference to the accompanying drawings.

DETAILED DESCRIPTION OF THE INVENTION

A hand-held electronic device according to the invention includes a body, a touch-sensing display area and a holding area. The touch-sensing display area located at a surface of the body is divided into several sub-touch-sensing areas disposed at a part of a surrounding region of the touch-sensing display area. The sub-touch-sensing areas have at least one access-sensing region. The access-sensing region is used for sensing a touch-control action so as to render the electronic device to perform a function corresponding to the touch-control action. The holding area is disposed outside the touch-sensing display area.

Figure 1:
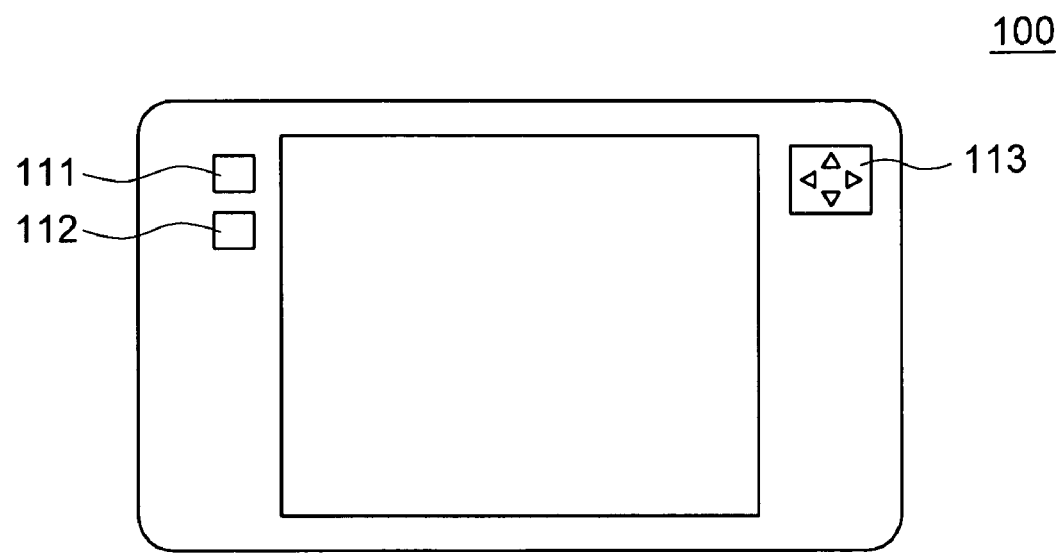
FIG. 1 (Prior Art) shows a front view of a conventional hand-held electronic device.
Figure 2A:
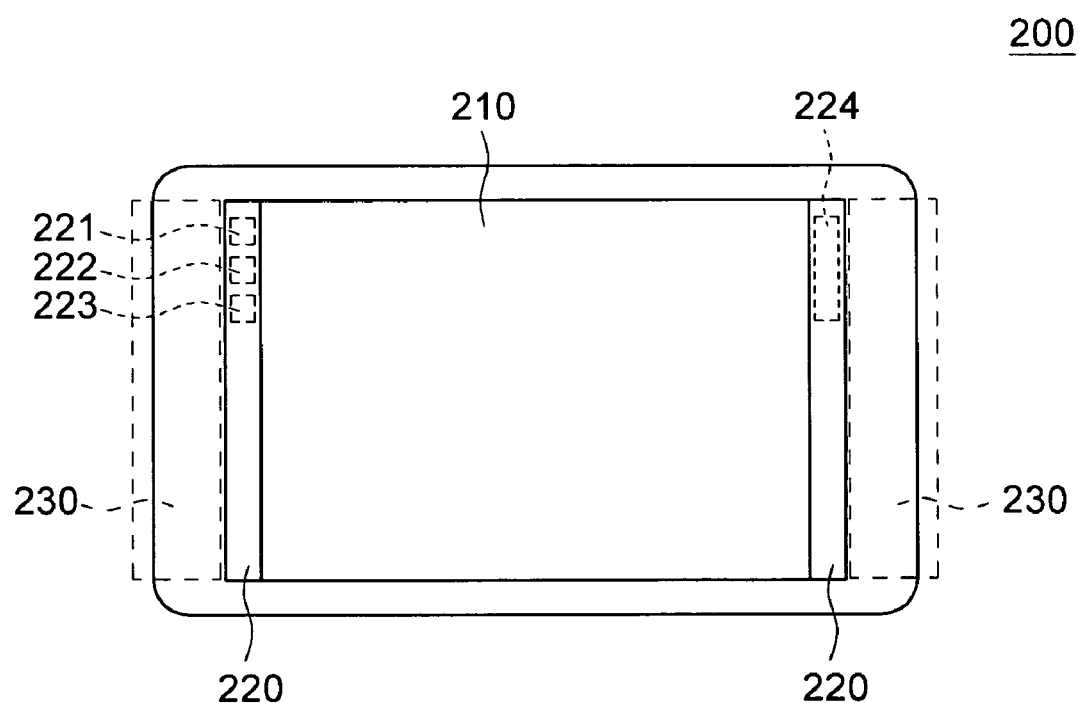
FIG. 2A shows a front view of a hand-held electronic device according to an embodiment of the invention.

Referring to FIG. 2A, a front view of a hand-held electronic device according to an embodiment of the invention is shown. The hand-held electronic device 200 includes a body (not illustrated), a touch-sensing display area 210 and a holding area 230. The touch-sensing display area 210 includes several sub-touch-sensing areas 220 disposed at a right side and a left side of the touch-sensing display area 210. The sub-touch-sensing areas 220 include several access-sensing regions 221, 222, 223 and 224. When a user performs a touch-control action to one of the access-sensing regions, the hand-held electronic device 200 performs a corresponding function.

Figure 2B:
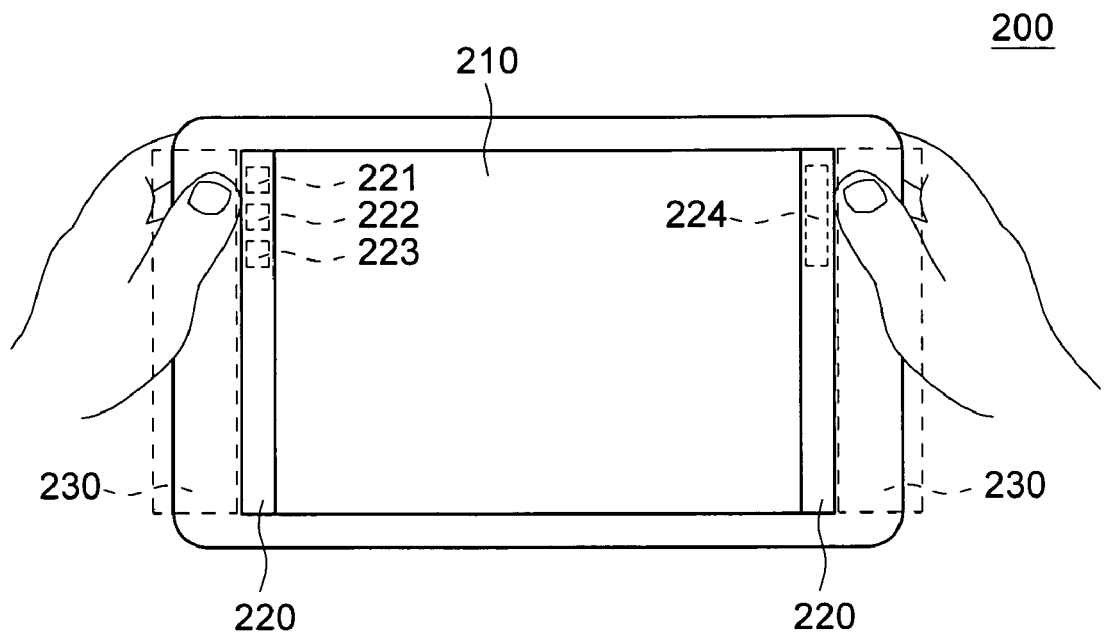
FIG. 2B shows the hand-held electronic device in FIG. 2A held by the user.

The holding area 230 is disposed outside the sub-touch-sensing areas 220. When the user's hand is merely placed on the holding area 230, the hand-held electronic device 200 does not perform any corresponding function. FIG. 2B shows the hand-held electronic device 200 in FIG. 2A held by the user. When the user only wants to hold the hand-held electronic device 200 by one hand or both hands, the user can place his hand on the holding area 230 comfortably without an unexpected operation of the hand-held electronic device 200 resulting from the unintentional touch of the sub-touch-sensing areas 220. It shows that no matter the user holds the hand-held electronic device 200 by one hand or both hands, the user's hand would not be taut because of worrying about the unexpection touch of the sub-touch-sensing areas 220. Therefore, the holding area 230 further has the advantage of relaxing the user's hands.

Figure 2C:
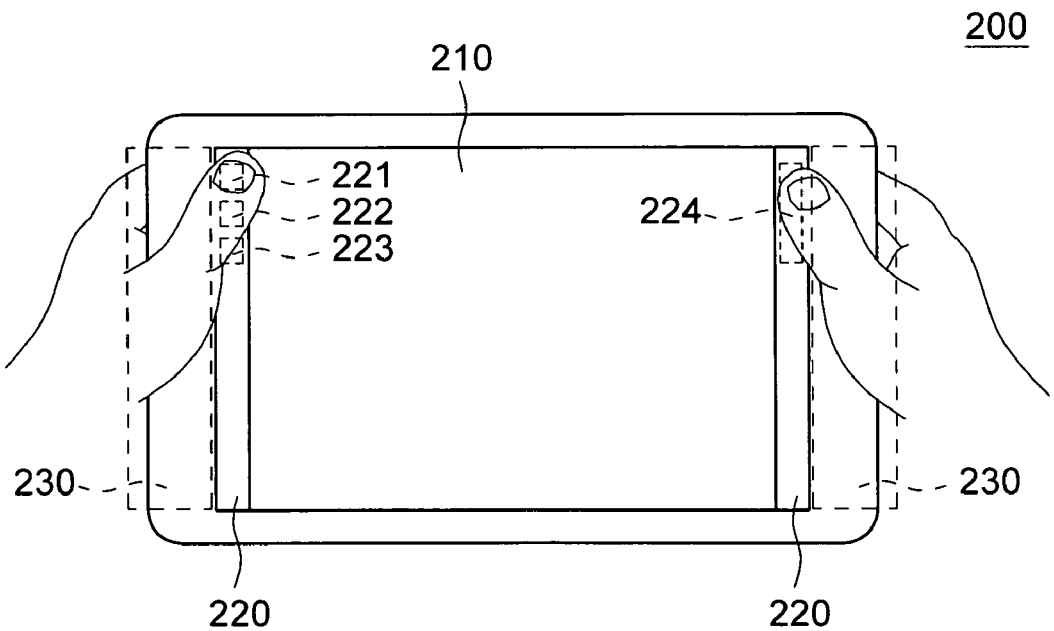
FIG. 2C shows the hand-held electronic device in FIG. 2A controlled by the user.

FIG. 2C shows the hand-held electronic device 200 in FIG. 2A controlled by the user. When the user performs a touch-control action, such as clicks the access-sensing region or drags on the access-sensing region, to at least one of the access-sensing regions 221~224 of the hand-held electronic device 200 in FIG. 2A, the hand-held electronic device 200 would perform a corresponding function.

Figure 3A:
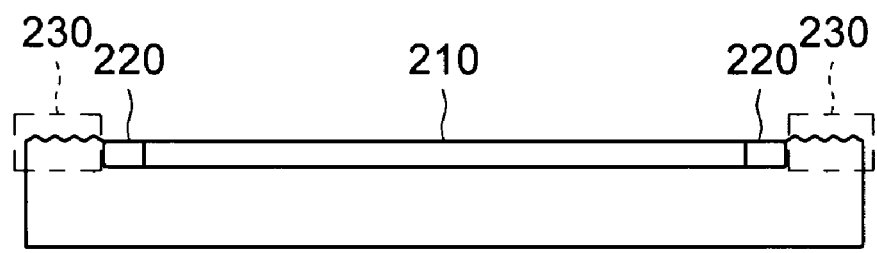
FIGS. 3A, 3B, 3C, 3D, 3E and 3F respectively show an example of a side view of the hand-held electronic device in FIG. 2A.
Figure 3B:
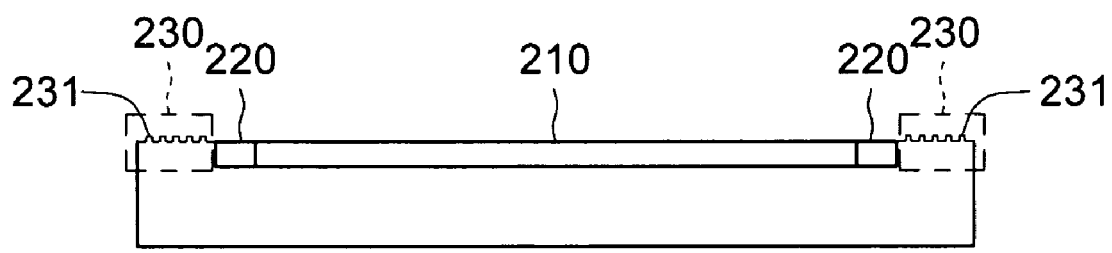
Figure 3C:
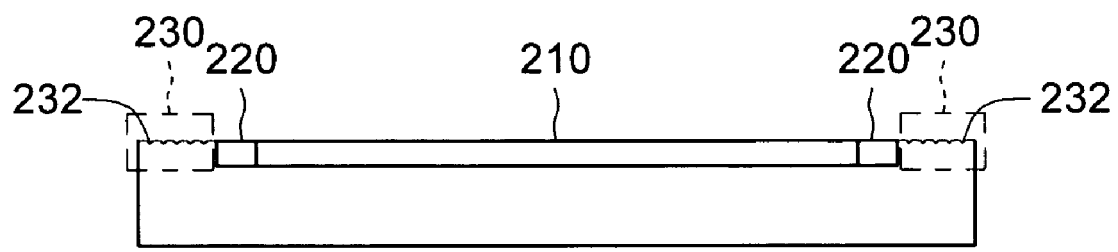

In order to operate smoothly, the distinguishability between the sub-touch-sensing areas 220 and the holding area 230 is needed. To further distinguish the sub-touch-sensing areas 220 from the holding area 230, the sub-touch-sensing areas 220 and the holding area 230 can be designed to have different surface structures, so that the user can distinguish the sub-touch-sensing areas 220 from the holding area 230 by the way of different touch feeling. Practically, the user can be reminded or warned that if his hand is placed at an appropriate position. FIG. 3A is an example of a side view of the hand-held electronic device 200 in FIG. 2A. Compared to the sub-touch-sensing areas 220, the holding area 230 of the hand-held electronic device 200 has a rougher surface structure. When the user operates the hand-held electronic device 200, the user can distinguish the sub-touch-sensing areas 220 from the holding area 230 only by the way of touch feeling without viewing it, so that the operation is more smoothly. FIG. 3B and FIG. 3C are other two examples of side views of the hand-held electronic device 200 in FIG. 2A. The surface of the holding area 230 of the hand-held electronic device 200 in FIG. 3B further has several protrusions. The surface of the holding area 230 of the hand-held electronic device 200 in FIG. 3C further has several indentations. The hand-held electronic device 200 in FIGS. 3A, 3B and 3C not only provides the convenient way to distinguish the sub-touch-sensing areas 220 from the holding area 230 by the way of touch feeling but also have the skidproof effect.

In the above three examples, the different touch feelings are provided by the surface of the holding area 230 and that of the sub-touch-sensing areas 220. However, in practical applications, any designs enabling the surface of the holding area 230 and that of the sub-touch-sensing areas 220 to provide different touch feelings for being distinguished are within the scope of the invention.

Figure 3D:
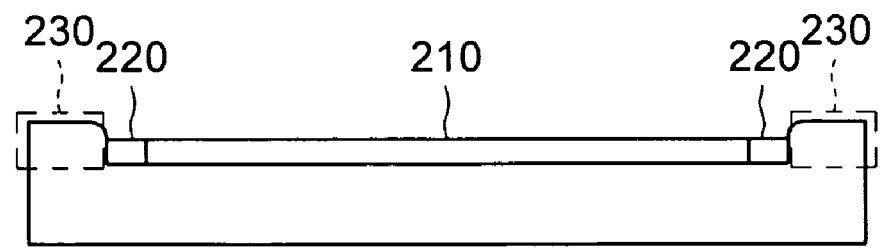
Figure 3E:
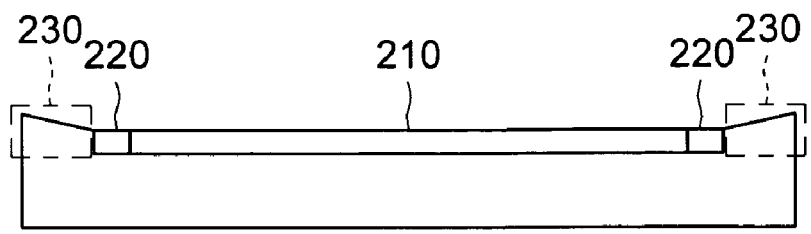

FIG. 3D shows an example of a side view of the hand-held electronic device 200 in FIG. 2A. The surface of the sub-touch-sensing areas 220 is located at a first plane, and the surface of the holding area 230 is located at a second plane. Thus, the sub-touch-sensing areas 220 and the holding area 230 are not co-planar. FIG. 3E shows another example of a side view of the hand-held electronic device 200 in FIG. 2A. The surface of the sub-touch-sensing areas 220 and the surface of the holding area 230 of the hand-held electronic device 200 form an inclined angle. The above two examples both allow the user to distinguish the sub-touch-sensing areas 220 from the holding area 230 by the way of viewing or touching.

Figure 3F:
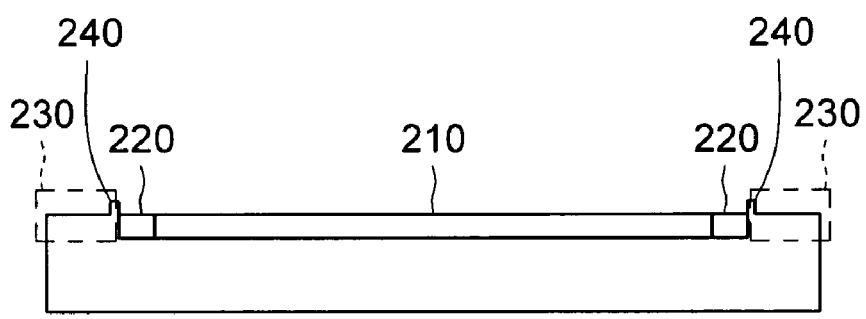

FIG. 3F shows another example of a side view of the hand-held electronic device 200 in FIG. 2A. At least one separation structure 240 is disposed between the sub-touch-sensing areas 220 and the holding area 230, so that the user can distinguish the position of the sub-touch-sensing areas 220 from that of the holding area 230 by the way of viewing or touching. In FIG. 3F, the separation structure 240 of the hand-held electronic device 200 is exemplified by a protruded structure. In practical applications, any separation structures, such as an indented structure or a light-emitting warning structure (LED or backlight), enabling the user to distinguish the position of the sub-touch-sensing areas 220 from that of the holding area 230 can be used in the hand-held electronic device 200.

Figure 3G:
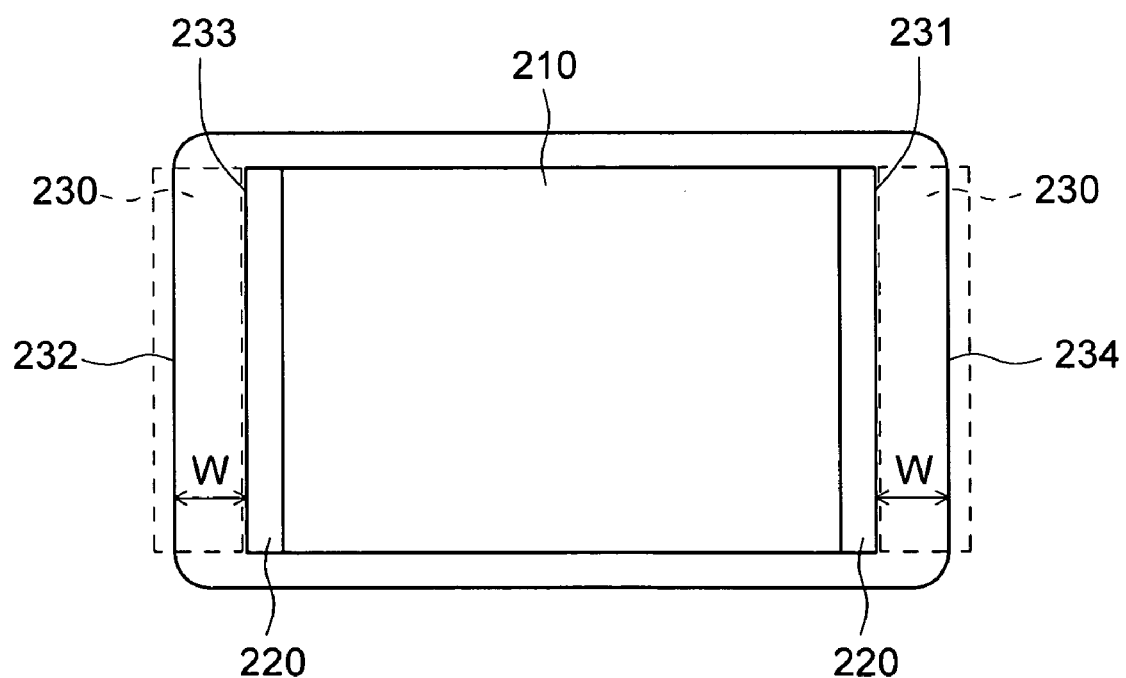
FIG. 3G shows another example of a front view of the hand-held electronic device in FIG. 2A.

FIG. 3G shows another example of a front view of the hand-held electronic device 200 in FIG. 2A. A width between a first side 233 and a second side 234 of the holding area 230 of the hand-held electronic device 200 is not less than 10 mm. The interval between the first side 233 and the second side 234 of the holding area 230 is designed to be an appropriate width W, so that the user would not unexpectedly touch the sub-touch-sensing areas 220 while merely holding the hand-held electronic device 200 and placing his hand on the holding area 230. Meanwhile, the user's hand can avoid being tired. The first side 233 is adjacent to the sub-touch-sensing areas 220, and the second side 234 is disposed at a side edge of the body of the hand-held electronic device 200. In the present embodiment of the invention, the appropriate width W is not less than 10 mm.

In the present embodiment of the invention, the hand-held electronic device 200 disposed with the sub-touch-sensing areas 220 at the right side and the left side of the touch-sensing display area 210 is illustrated, but the practical applications are not limited thereto. Any hand-held electronic device having touch-sensing areas at any regions of the surrounding of the display area is within the scope of the invention.

In the present embodiment of the invention, the hand-held electronic device 200 having four access-sensing regions 221~224 is illustrated, but practical applications are not limited to the four access-sensing regions. Any hand-held electronic devices having any number of access-sensing regions or having access-sensing regions disposed at any part of the sub-touch-sensing areas 220 are within the scope of the invention.

In the present embodiment of the invention, the input keys of the conventional hand-held electronic device are replaced by the several sub-touch-sensing areas of the hand-held electronic device according to the embodiment of the invention. The sub-touch-sensing areas further cooperate with the holding area, so that the sub-touch-sensing areas are not touched unexpectedly when the user does not operate the hand-held electronic device. Therefore, the risk of the unexpected operation of the hand-held electronic device is reduced. Compared with the conventional hand-held electronic device disposed with the separate input keys, the sub-touch-sensing areas divided into several access-sensing regions can save space and increase the space utilization. Under the condition of the same-size displaying area, the space outside the touch-sensing display area of the hand-held electronic device can be saved. In addition, the user is provided with smooth control experience by using the access-sensing region of the hand-held electronic device without increasing the size and sacrificing functions of the hand-held electronic device. Furthermore, another advantage of replacing the input keys of the conventional technology with the sub-touch-sensing areas is that the size of the mechanical structure can be reduced and the hand-held electronic device becomes further thinned.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hand-held electronic device, comprising: a body; a touch-sensing display area located at a surface of the body, wherein the touch-sensing display area further comprises a plurality of sub-touch-sensing areas disposed at a part of a surrounding region of the touch-sensing display area; a holding area disposed outside the touch-sensing display area; and a separation structure disposed between the holding area and the touch-sensing display area, wherein a first side of the holding area is adjacent to the touch-sensing display area, a second side of the holding area is disposed at a side edge of the body, and a width between the first side and the second side is not less than 10 mm.

2. The device according to claim 1, wherein the sub-touch-sensing areas have at least one access-sensing region for sensing a touch-control action so as to render the hand-held electronic device to perform a function corresponding to the touch-control action.

3. The device according to claim 1, wherein a surface of the holding area is located at a first plane and a surface of the touch-sensing display area is located at a second plane.

4. The device according to claim 1, wherein a surface of the holding area and a surface of the touch-sensing display area form an inclined angle.

5. The device according to claim 1, wherein the holding area has a first surface structure and the touch-sensing display area has a second surface structure.

6. The device according to claim 1, wherein a surface of the holding area further has a plurality of protrusions.

7. The device according to claim 1, wherein a surface of the holding area further has a plurality of indentations.

8. The device according to claim 1, the separation structure is a protruded structure, an indented structure or a light-emitting structure.

9. The device according to claim 1, one of the sub-touch-sensing areas is disposed at a left side and/or a right side of the touch-sensing display area.

10. A hand-held electronic device, comprising:
a body;
a touch-sensing display area located at a surface of the body, wherein the touch-sensing display area further comprises a plurality of sub-touch-sensing areas disposed at a part of a surrounding region of the touch-sensing display area; and
a holding area disposed outside the touch-sensing display area;
wherein the holding area has a first surface structure and the touch-sensing display area has a second surface structure, the first surface structure having a plurality of protrusions or a plurality of indentations.

11. The device according to claim 10, wherein the sub-touch-sensing areas have at least one access-sensing region for sensing a touch-control action so as to render the hand-held electronic device to perform a function corresponding to the touch-control action.

12. The device according to claim 10, wherein a surface of the holding area is located at a first plane and a surface of the touch-sensing display area is located at a second plane.

13. The device according to claim 10, wherein a surface of the holding area and a surface of the touch-sensing display area form an inclined angle.

14. The device according to claim 10, wherein the device further comprises a separation structure disposed between the holding area and the touch-sensing display area.

15. The device according to claim 14, the separation structure is a protruded structure, an indented structure or a light-emitting structure.

16. The device according to claim 10, one of the sub-touch-sensing areas is disposed at a left side and/or a right side of the touch-sensing display area.

17. The device according to claim 10, wherein a first side of the holding area is adjacent to the touch-sensing display area, a second side of the holding area is disposed at a side edge of the body, and a width between the first side and the second side is not less than 10 mm.

* * * * *